United States Patent
Medina et al.

(10) Patent No.: US 8,087,559 B2
(45) Date of Patent: Jan. 3, 2012

(54) WHEELCHAIR VEHICLE RAMP

(75) Inventors: David Medina, New Port Richey, FL (US); Joseph Ryan Cox, Tampa, FL (US); Carlos Orozco, Wesley Chapel, FL (US)

(73) Assignee: University of South Florida, Tampa, FL (US)

( * ) Notice: Subject to any disclaimer, the term of this patent is extended or adjusted under 35 U.S.C. 154(b) by 978 days.

(21) Appl. No.: 11/554,182

(22) Filed: Oct. 30, 2006
(Under 37 CFR 1.47)

(65) Prior Publication Data

US 2007/0241153 A1 Oct. 18, 2007

Related U.S. Application Data

(60) Provisional application No. 60/731,331, filed on Oct. 28, 2005.

(51) Int. Cl.
*B60R 9/06* (2006.01)

(52) U.S. Cl. .................. 224/497; 224/502; 224/519

(58) Field of Classification Search ............... 224/497, 224/499, 502–509, 519, 537; 296/61
See application file for complete search history.

(56) References Cited

U.S. PATENT DOCUMENTS

| | | | |
|---|---|---|---|
| 5,199,842 A | 4/1993 | Watt et al. | |
| 5,649,732 A * | 7/1997 | Jordan et al. | 296/26.1 |
| 6,076,215 A | 6/2000 | Blankenship et al. | |
| 6,379,101 B1 * | 4/2002 | Breaux | 414/537 |
| 6,533,337 B1 * | 3/2003 | Harshman et al. | 296/26.08 |
| 6,783,315 B1 | 8/2004 | Senechal | |
| 7,261,356 B1 * | 8/2007 | Taylor | 296/61 |
| 2003/0044266 A1 * | 3/2003 | Vandillen et al. | 414/537 |
| 2004/0251661 A1 | 12/2004 | Davis | |

* cited by examiner

*Primary Examiner* — Justin Larson
*Assistant Examiner* — Adam Waggenspack
(74) *Attorney, Agent, or Firm* — Ronald E. Smith; Smith & Hopen, P.A.

(57) ABSTRACT

A loading apparatus for allowing wheelchair access to a vehicle is provided. The apparatus attaches to the hitch receiver of the vehicle, such as a van, truck or similar vehicle. The apparatus includes three ramp section pivotably connected such that the apparatus does not obstruct vision through the rear of the vehicle but also provides sufficient ground clearance for operation of the vehicle.

2 Claims, 12 Drawing Sheets

WHEELCHAIR VEHICLE RAMP

CROSS REFERENCE TO RELATED APPLICATIONS

This application claims priority to currently pending U.S. Provisional Patent Application 60/731,331 filed Oct. 28, 2005.

FIELD OF INVENTION

This invention relates to a device for allowing wheelchair access to vehicles.

BACKGROUND OF THE INVENTION

Wheelchair ramps comprising an inclined plane are often installed to permit wheelchair users, as well as people pushing strollers, carts, or other wheeled objects, to more easily access a vehicle such as a van or public transportation.

Ramps must be carefully designed in order to be useful. Many jurisdictions have established standards for wheelchair ramps. For example, they may specify the minimum width of a wheelchair ramp is 36 inches, and the slope must not be steeper than 1 inch of rise for every 12 inches of length. A less steep rise can be easier for a wheelchair user to navigate, as well as safer in icy climates.

Wheelchair ramps come in a number of varieties each intended for a different purpose. There are permanent, semi-permanent and portable. Permanent ramps are designed to be bolted or welded in place. Portable ramps are lightweight, usually aluminum and typically fold for ease of transport. Wheelchair ramps (or other ways for wheelchair users to gain access) are required for public accommodations in the U.S. by the Americans with Disabilities Act. Similar solutions are also needed by wheelchair users to gain access to private vehicles.

What is needed is a cost effective solution to transporting a wheelchair in a vehicle using a folding ramp that mounts to the vehicle's trailer hitch. A preferred device should fold such that it does not obstruct visibility through the back window. The ramp should also be mounted outside the vehicle, to conserve interior room, but not obstruct the operation of the rear door.

SUMMARY OF INVENTION

The novel structure is a wheelchair ramp detachably connected to a trailer hitch that is mounted to a vehicle at a trailing end of said vehicle. It includes a T-shaped frame disposed in a horizontal plane that includes a longitudinally-extending part and a transversely extending part. The longitudinally-extending part is disposed in substantial axial alignment with a longitudinally-extending part of the trailer hitch when the wheelchair ramp is connected to the trailer hitch. A first mounting plate is disposed in a vertical plane and mounted to a first end of the transversely extending part substantially mid-length of the first mounting plate. A second mounting plate is disposed in a vertical plane and mounted to a second end of the transversely extending part substantially mid-length of the second mounting plate so that the first and second mounting plates are disposed in transversely spaced apart, parallel relation to one another. A first, elongate, transversely disposed hinge pin is disposed in interconnecting relation between the first and second mounting plates at respective leading ends of the first and second mounting plates. A second, elongate, transversely disposed hinge pin is disposed in interconnecting relation between the first and second mounting plates at respective trailing ends of the first and second mounting plates. A first ramp section is hingedly mounted to the first hinge pin near a trailing end of the first ramp section so that the first ramp section can be pivoted about the first hinge pin into a vertical plane without being obstructed by the second hinge pin. The first ramp section is in a stored and non-operable position when in the vertical plane. A second ramp section is hingedly mounted to the second hinge pin near a leading end of the second ramp section so that the second ramp section can be pivoted about the second hinge pin into a vertical plane without being obstructed by the first hinge pin, the second ramp section being in a stored and non-operable position when in said vertical plane. The first ramp section is shorter than the second ramp section. A leading end of the first ramp section is closely spaced apart from an interior of the vehicle when the first ramp section is in an inclined position so that a wheelchair supported by the first ramp section may advance from the first ramp section into a wheelchair-receiving space in an interior of the vehicle. A third ramp section has a leading end hingedly connected to a trailing end of the second ramp section so that the third ramp section is foldable relative to the second ramp section. The first, second and third ramp sections are stored in three parallel vertical planes when the first ramp section is pivoted about the first hinge pin into a first vertical plane, the second ramp section is pivoted about the second hinge pin into a second vertical plane that is adjacent the first vertical plane, and the third ramp section is pivoted relative to the second ramp section into a third vertical plane adjacent the second vertical plane, said three parallel vertical planes being transversely disposed relative to the longitudinally-extending parts of the T-shaped frame and the trailer hitch.

The hinged connection between the second ramp section and the third ramp section enables the third ramp section to be folded into underlying relation to the second ramp section when the second and third ramp sections are in a deployed, operable configuration.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
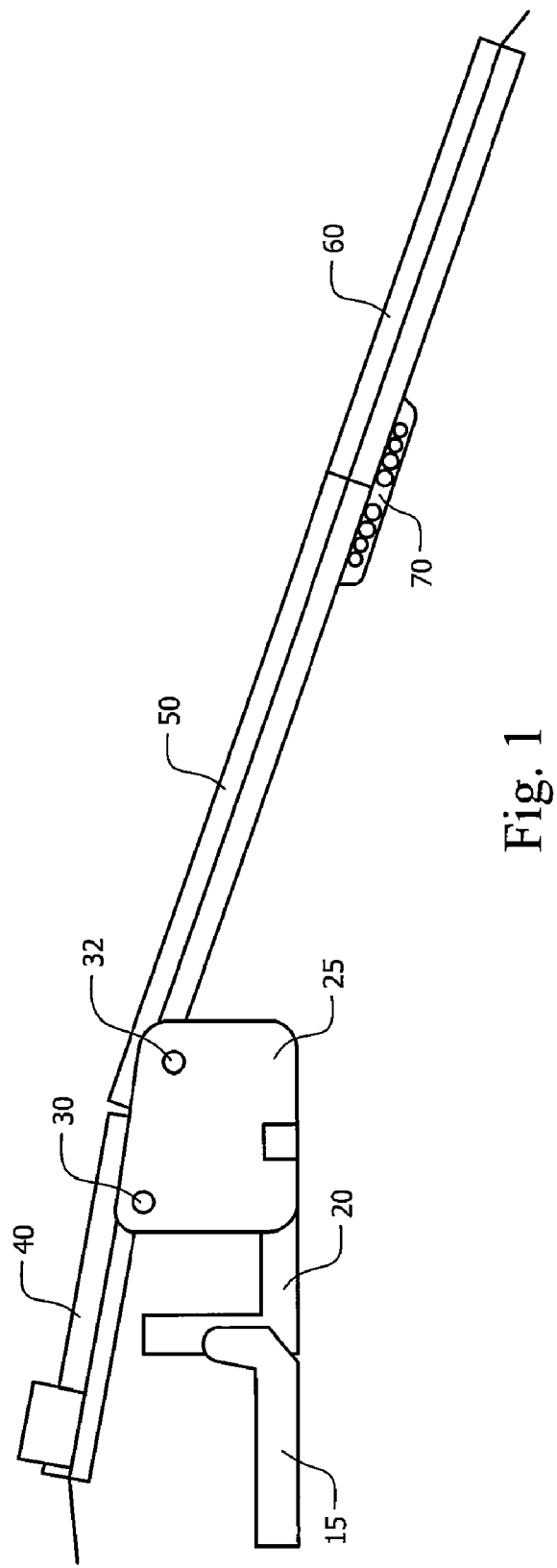
FIG. 1 is a perspective view of the inventive wheelchair ramp.
Figure 2A:
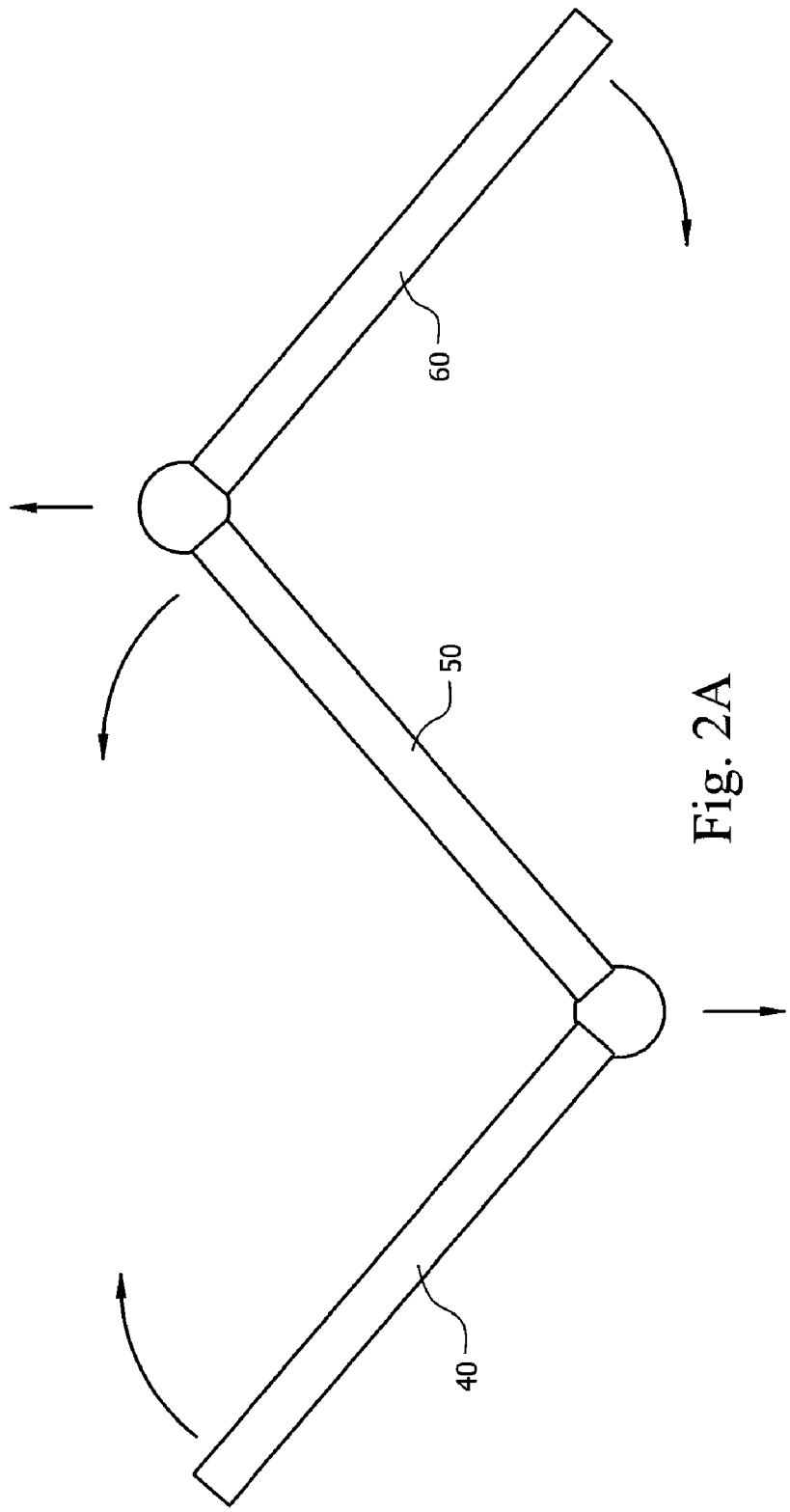
FIG. 2 is a block diagram illustrating the relative movement of the ramp sections.
Figure 2B:
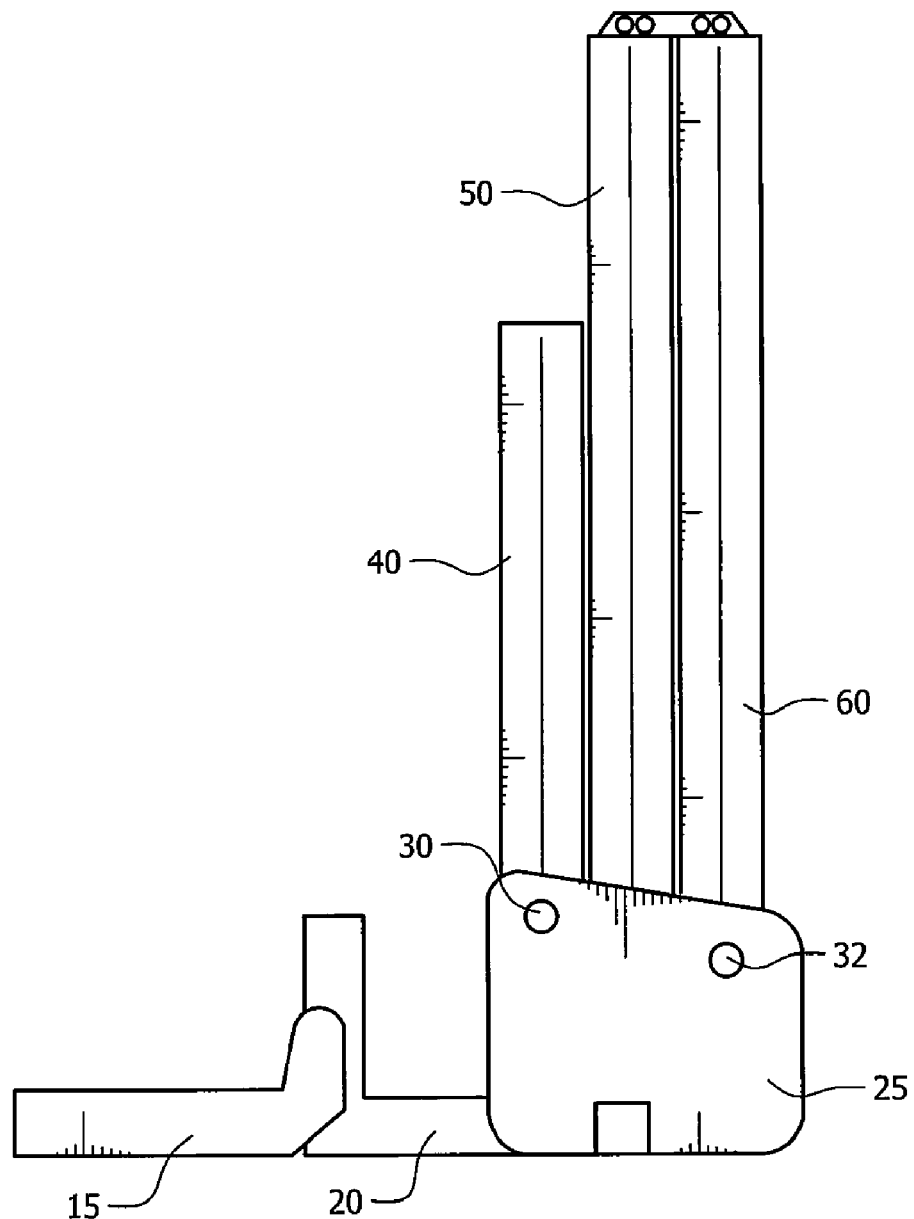

An illustrative embodiment of the invention is shown in FIG. 1. Ramp 10 comprises hitch arm 15 which is connected to frame 20. Rod 30 connects first ramp 40 to plates 25; whereas rod 32 connects second ramp 50 to plates 25. Third ramp 60 is pivotably connected to second ramp 50 by virtue of hinge 70. FIG. 2 provides a block diagram showing the relative movement of the first, second and third ramps.

Figure 3:
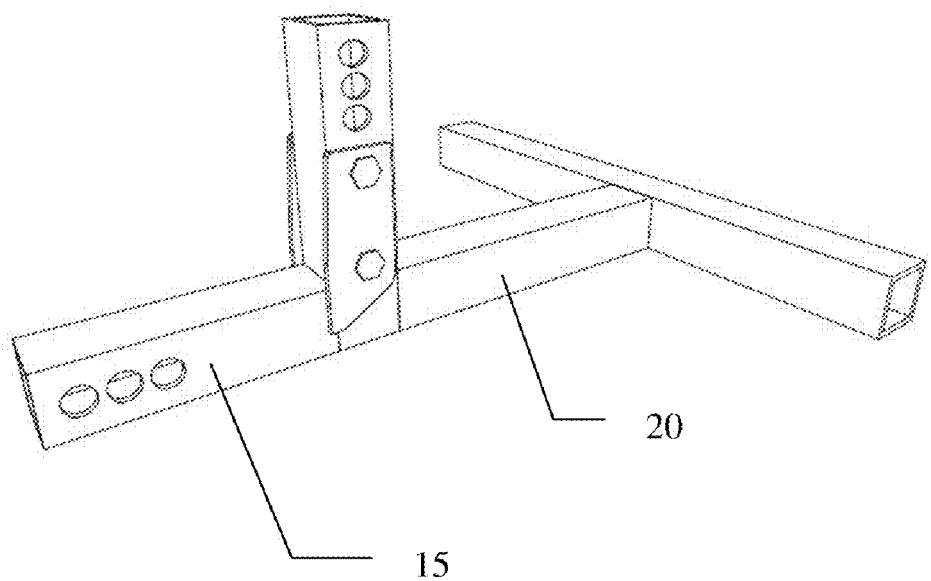
FIG. 3 is a perspective view of the hitch arm and frame.
Figure 4:
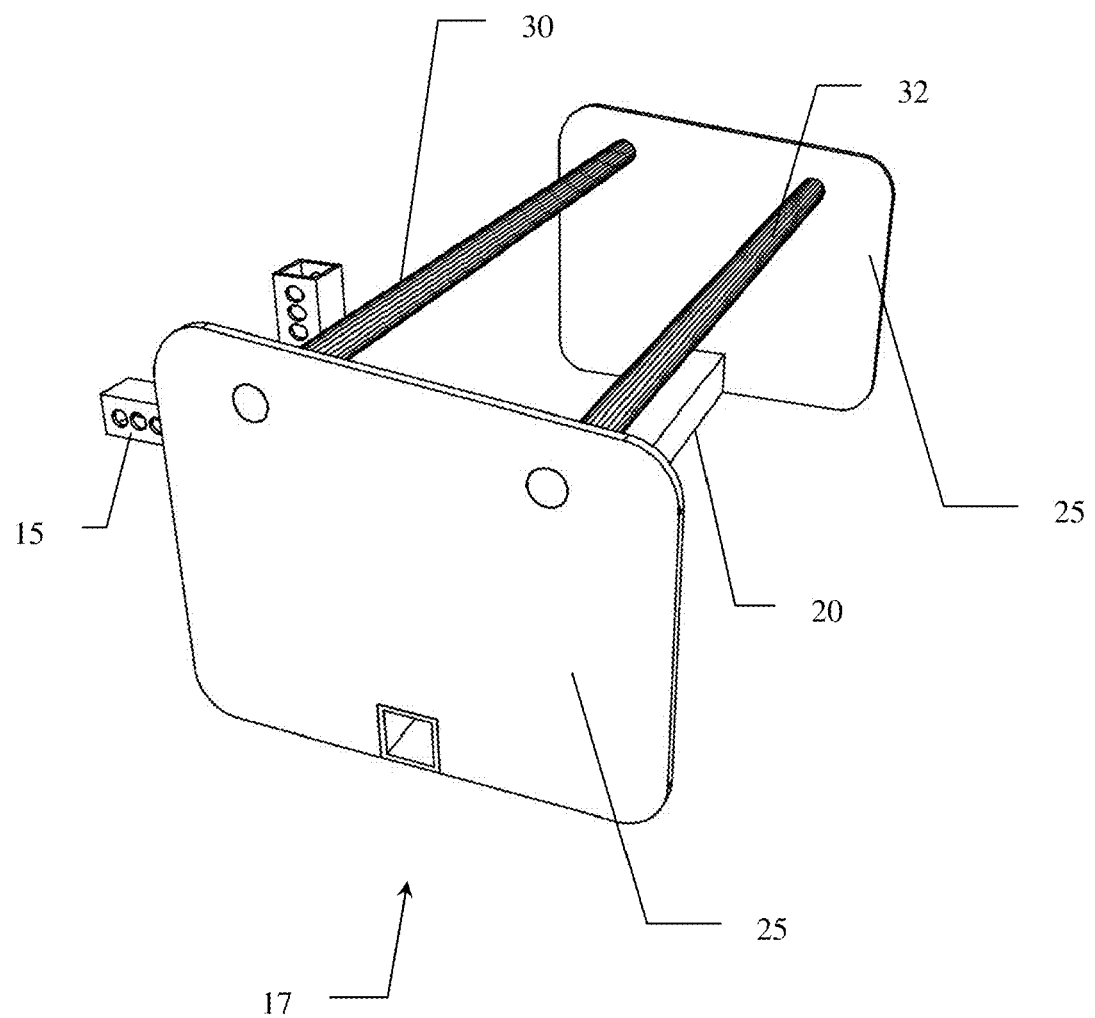
FIG. 4 is a perspective view of the base assembly.

Hitch arm 15 can be permanently affixed to frame 20, such as by welding, or adjustably fixed by virtue of removeable bolts as shown in FIG. 1 and FIG. 3. This embodiment also allows a means of adjusting the height of ramp 10. One plate 25 is attached to each side of frame 20 (see also FIG. 4), preferably by welding. Rod 30 and rod 32 are disposed between plates (25). Accordingly, hitch arm 15, frame 20, plates 5, rod 30 and rod 32 are combined to form base assembly 17 (FIG. 4). Frame 20 and plates 25 are preferably constructed from a material exhibiting high strength to different loads or stress and possessing ease of workability; such as mild steel.

Figure 5:
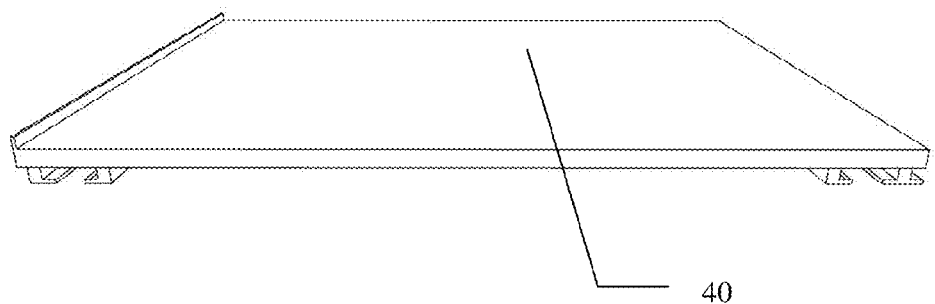
FIG. 5 is a perspective view of the first ramp section.
Figure 6:
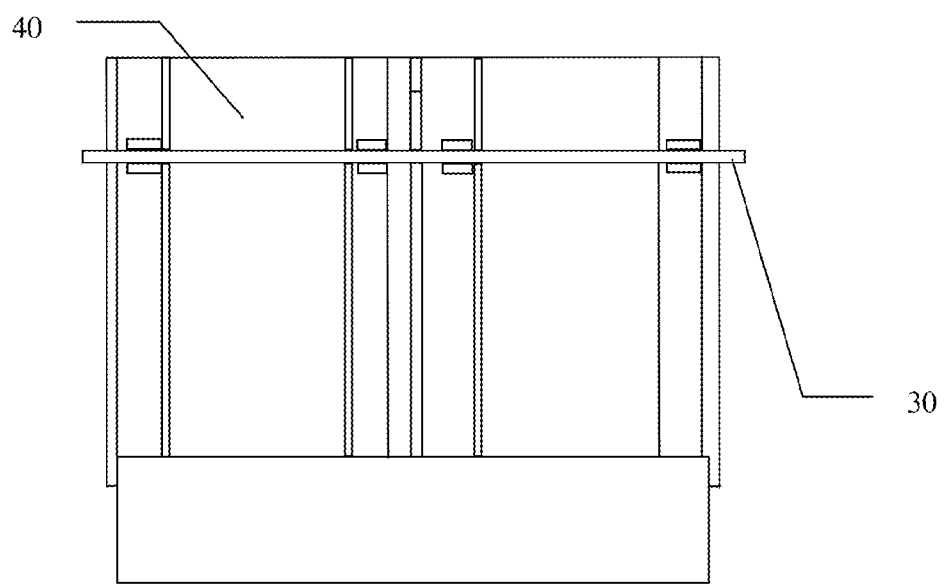
FIG. 6 is a perspective view of the first ramp section attached to the rod.
Figure 7:
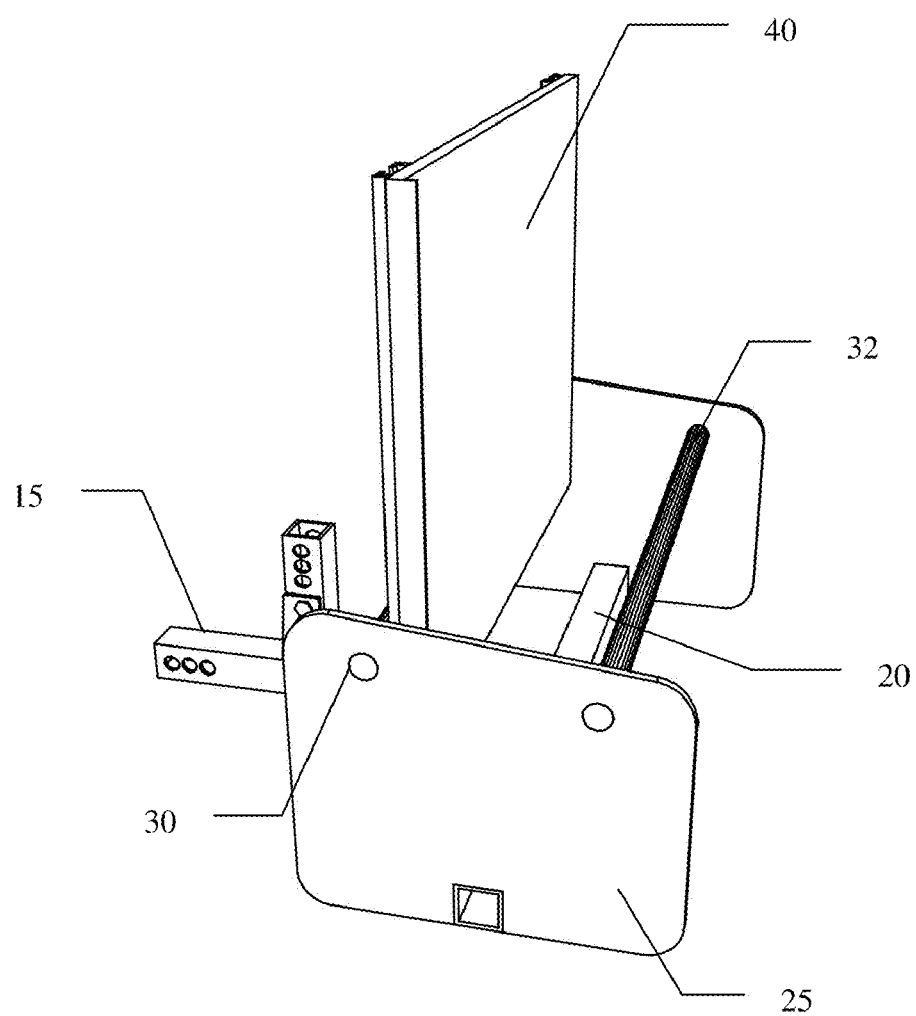
FIG. 7 is a perspective view of the first ramp section attached to the base assembly.

First ramp section 40 (FIG. 5) is pivotably connected to base assembly 17 by virtue of rod 30. One method of connecting first ramp 40 to rod 30 is shown in FIG. 6. As shown in FIG. 7, ramp 40 is pivotably connected to base assembly 17 such that the first (or free) end of first ramp 40 is substantially perpendicular to the ground in the retracted position. First ramp 40 is adapted to pivot from the substantially perpendicular position of FIG. 7 to a position wherein the first end of first ramp 40 contacts the interior of the vehicle in the extended position.

Figure 8:
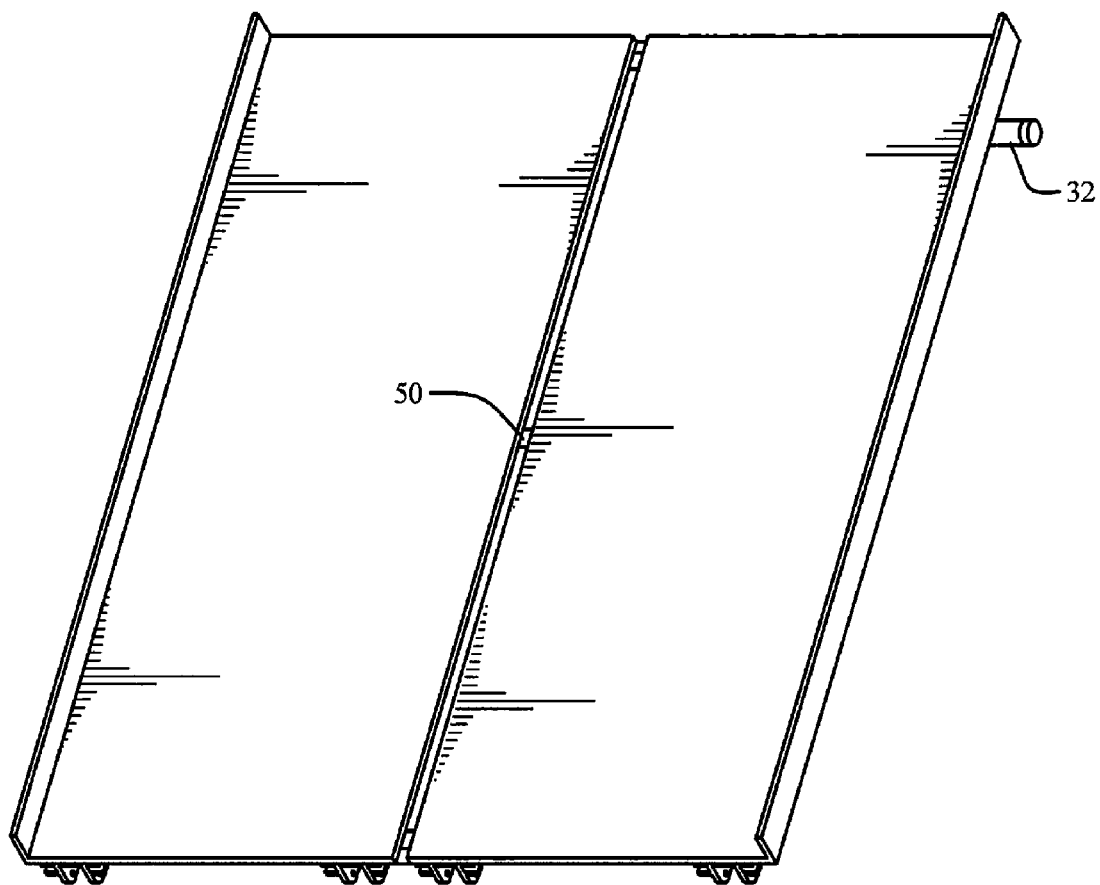
FIG. 8 is a perspective view of the second ramp section.
Figure 9:
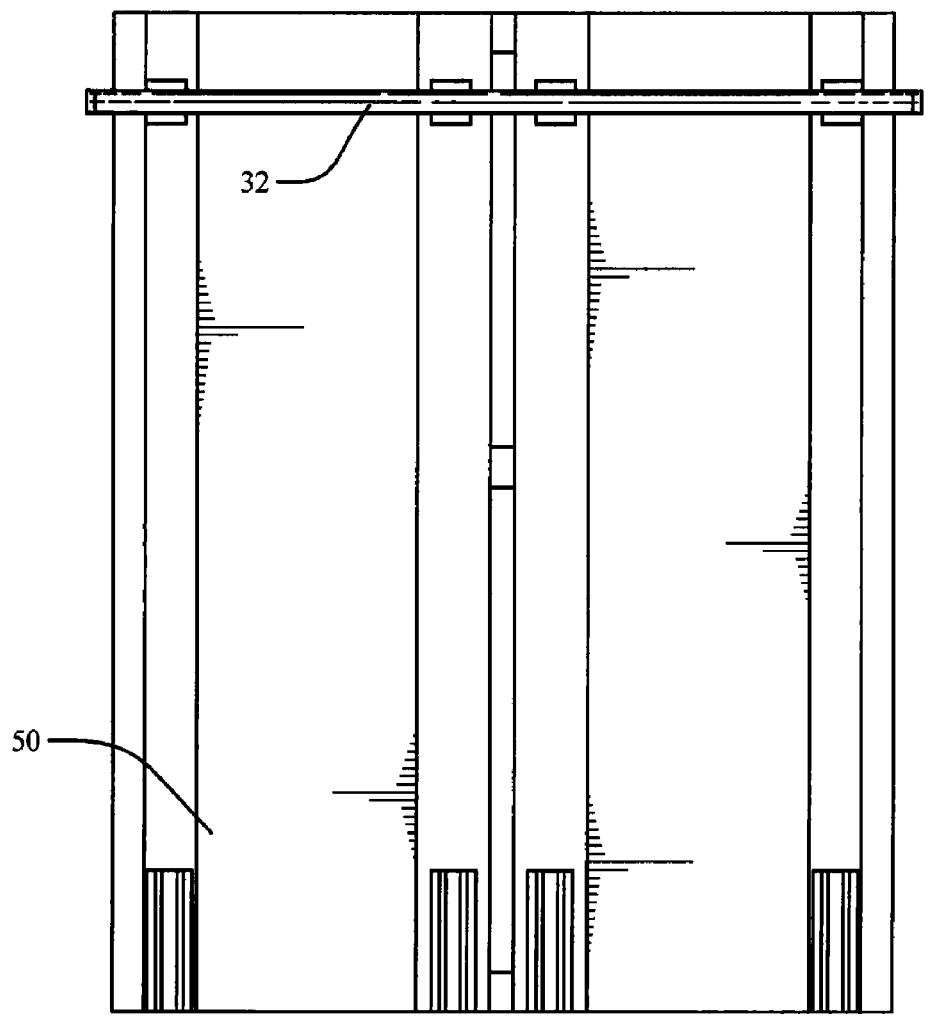
FIG. 9 is a perspective view of the second ramp section attached to the rod.

Second ramp 50 is connected to base 17 by rod 32. Second ramp 50 differs in its connection to base 17 from that of first ramp 40 in that the first end of second ramp 50 connects to rod 32 as show in FIGS. 8 and 9; rather than the second (or lower) end.

Figure 10:
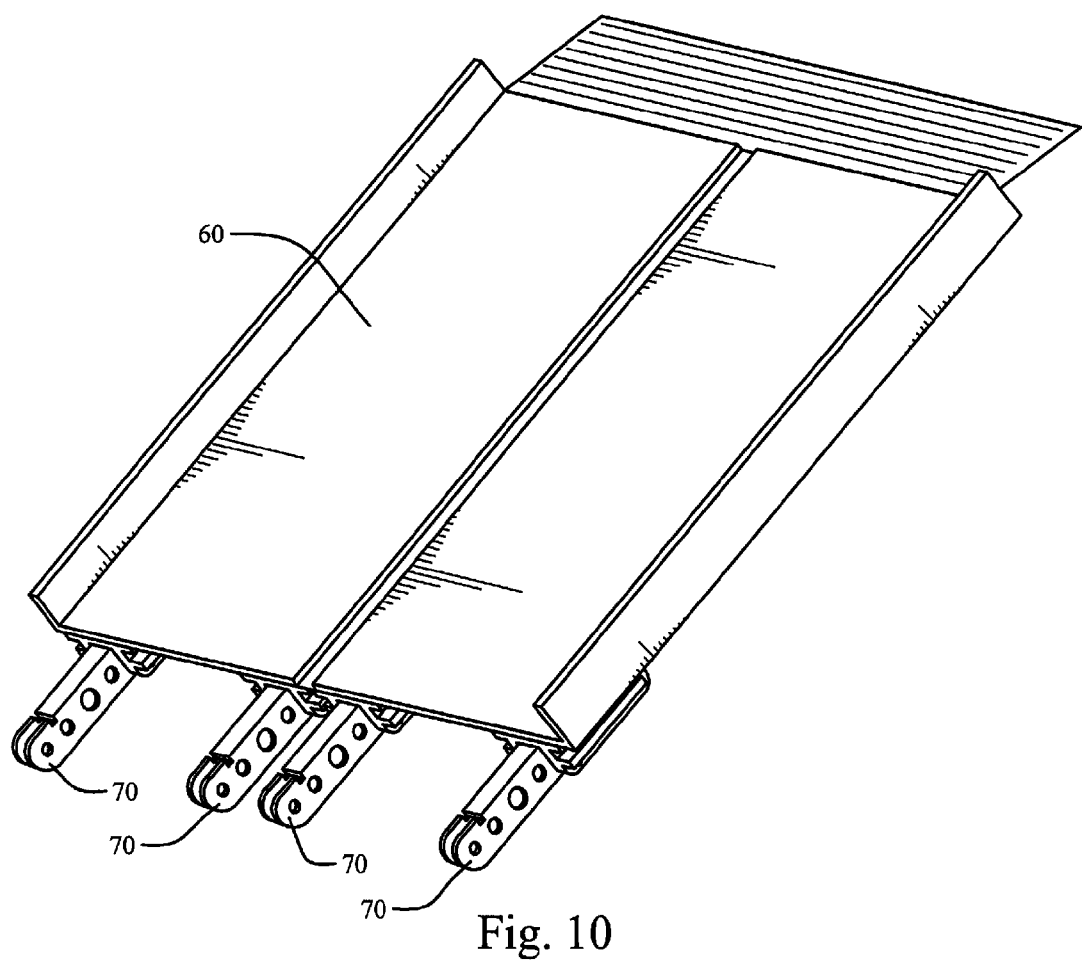
FIG. 10 is a perspective view of the third ramp section and hinge assembly.
Figure 11:
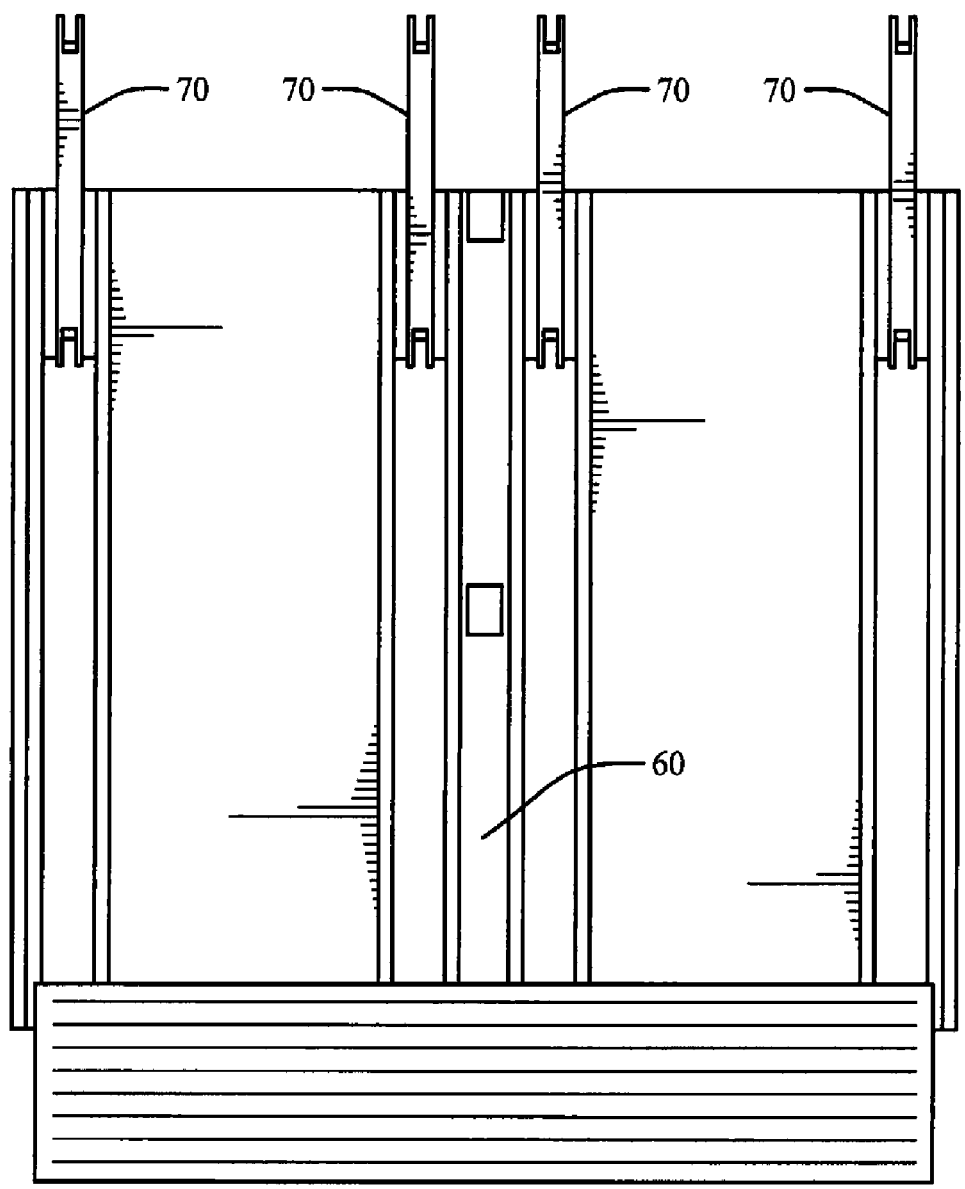
FIG. 11 is a perspective view of the third ramp section and hinge assembly.
Figure 12:
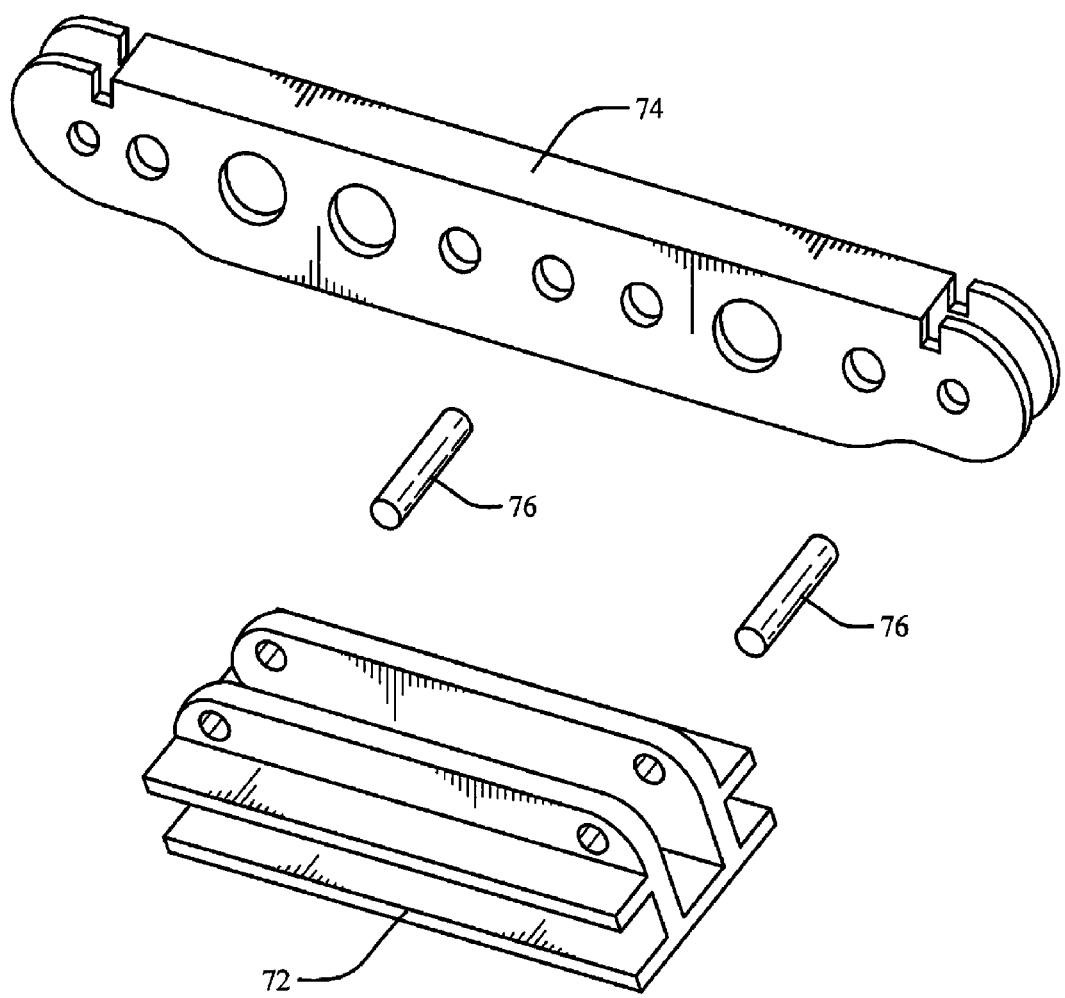
FIG. 12 is an exploded view of the hinge assembly.

Third ramp 60 does not attach directly to base 17 but is instead pivotably connected to the second end of second ramp 50. Third ramp 60 connects at its first end to the second end of second ramp 50 through hinge assembly 70 (FIG. 10). The second end of third ramp contacts the ground when ramp 10 is extended. Hinge assembly 70 is shown in an exploded view in FIG. 12. Hinge base 72 attaches directly to the bottom of third ramp 60. Hinge socket 74 is attached to hinge base 32 through hinge rods 76. Locking pins, not shown, are used to secure ramp 10 in the retracted position while the vehicle is in motion.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described.

What is claimed is:

1. A wheelchair ramp, comprising:
   a trailer hitch mounted to a trailing end of a vehicle, said trailer hitch having a longitudinally-extending part and extending in a horizontal plane;
   a T-shaped frame having a longitudinally extending part and a transversely extending part which are both located in the same horizontal plane as the trailer hitch, the T-shaped frame being releasably attached to said trailer hitch;
   a T-shaped frame disposed in a horizontal plane that includes a longitudinally-extending part and a transversely extending part;
   said longitudinally-extending part of said T-shaped frame disposed in substantial axial alignment with and being connected to said longitudinally-extending part of said trailer hitch when said wheelchair ramp is connected to said trailer hitch;
   a first mounting plate disposed in a vertical plane and mounted in perpendicular relation to a first end of said transversely extending part substantially mid-length of said first mounting plate;
   a second mounting plate disposed in a vertical plane and mounted in perpendicular relation to a second end of said transversely extending part substantially mid-length of said second mounting plate so that said first and second mounting plates are disposed in transversely spaced apart, parallel relation to one another at opposite ends of said transversely extending part of said T-shaped frame;
   a first, elongate, transversely disposed hinge pin disposed in interconnecting relation between said first and second mounting plates at respective leading ends of said first and second mounting plates;
   a second, elongate, transversely disposed hinge pin disposed in interconnecting relation between said first and second mounting plates at respective trailing ends of said first and second mounting plates;
   a first ramp section hingedly mounted to said first hinge pin near a trailing end of said first ramp section so that said first ramp section can be pivoted about said first hinge pin into a vertical plane without being obstructed by said second hinge pin, said first ramp section being in a stored and non-operable position when in said vertical plane;
   a second ramp section hingedly mounted to said second hinge pin near a leading end of said second ramp section so that said second ramp section can be pivoted about said second hinge pin into a vertical plane without being obstructed by said first hinge pin, said second ramp section being in a stored and non-operable position when in said vertical plane;
   said first ramp section being shorter than said second ramp section;
   a leading end of said first ramp section being closely spaced apart from an interior of said vehicle when said first ramp section is in an inclined position so that a wheelchair supported by said first ramp section may advance from said first ramp section into a wheelchair-receiving space in an interior of said vehicle;
   a third ramp section having a leading end hingedly connected to a trailing end of said second ramp section so that said third ramp section is foldable relative to said second ramp section;
   said first, second and third ramp sections being stored in three parallel vertical planes when said first ramp section is pivoted about said first hinge pin into a first vertical plane, said second ramp section is pivoted about said second hinge pin into a second vertical plane that is adjacent said first vertical plane, and said third ramp section is pivoted relative to said second ramp section into a third vertical plane adjacent said second vertical plane, said three parallel vertical planes being transversely disposed relative to said longitudinally-extending parts of said T-shaped frame and said trailer hitch.

2. The wheelchair ramp of claim 1, further comprising:
said hinged connection between said second ramp section and said third ramp section enabling said third ramp section to be folded into underlying relation to said second ramp section when said second and third ramp sections are in a deployed, operable configuration.

* * * * *